UNITED STATES PATENT OFFICE.

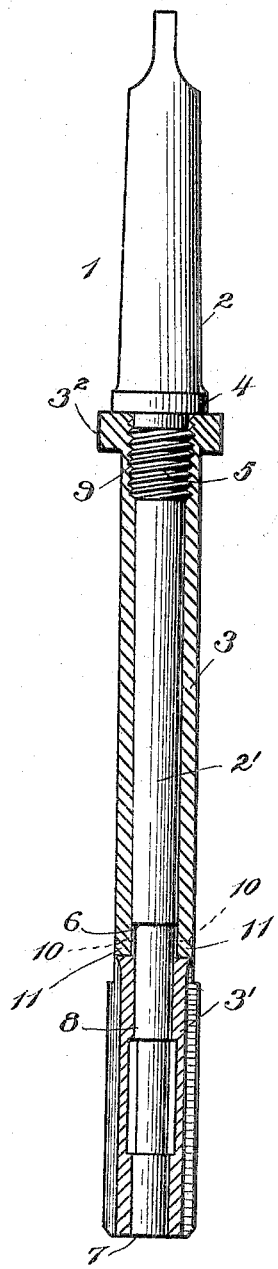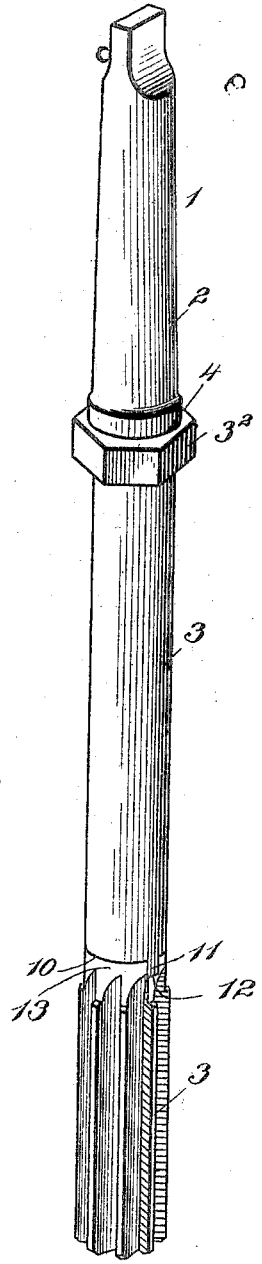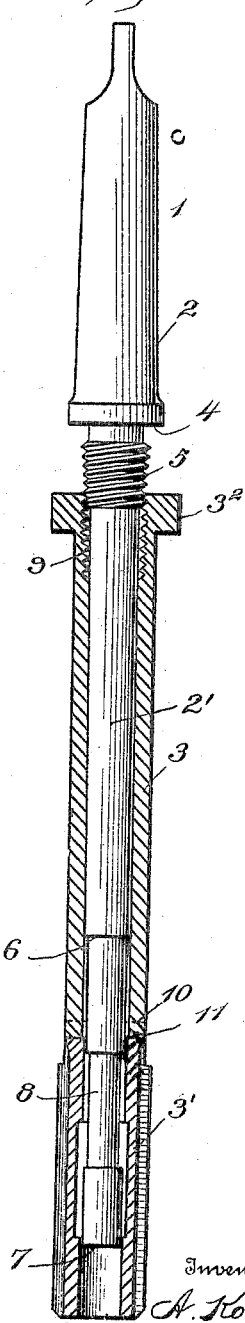

ALBERT KOOTZ AND CHARLES FREDERICK FISHER, OF PARKERSBURG, WEST VIRGINIA.

BORING-TOOL AND ARBOR.

No. 817,377.      Specification of Letters Patent.      Patented April 10, 1906.

Application filed March 11, 1905. Serial No. 249,643.

*To all whom it may concern:*

Be it known that we, ALBERT KOOTZ and CHARLES FREDERICK FISHER, citizens of the United States, residing at Parkersburg, in the county of Wood and State of West Virginia, have invented certain new and useful Improvements in Boring-Tools and Arbors; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to "arbors," and has for its object to provide a device of this class for carrying reamers, cutters, and metal-working tools.

It is a matter of common knowledge that when a reamer or cutter is applied to an ordinary arbor it is extremely difficult to detach the reamer or tool, and frequently the device is mutilated and broken in detaching it.

It is for the purpose of providing a simple and easily-manipulated arbor and reamer or cutting-tool that we have made our invention; and our invention therefore consists in providing a device wherein the reamer or cutting-tool can be quickly and easily disengaged from the arbor without in any way injuring either the arbor, reamer, or cutting-tool or any part of the device.

Referring to the accompanying drawings, Figure 1 is a perspective view of the device. Fig. 2 is a view, partly in vertical section, showing reamer in position for operation; and Fig. 3 is a similar view showing reamer partly disengaged from arbor.

Like numerals of reference indicate the same parts throughout the several figures, in which—

1 indicates the device, which comprises the arbor 2, shank 2', sleeve 3, and reamer 3', it of course being understood that this device is designed to accommodate any character of cutting-tool. As shown particularly in Figs. 2 and 3, the arbor 1 is provided with a shoulder 4, and a portion of the arbor is threaded at 5, and it is preferably tapered to the point 6, where it is reduced and tapered to the end 7, the portion 8, extending beyond the sleeve 3, accommodating the reamer or cutting-tool.

The sleeve 3 has, as shown, a nut $3^2$ formed thereon to accommodate a wrench, and the upper portion of the sleeve is internally threaded at 9. The lower end 10 of the sleeve 3 is preferably provided with two lugs 11, constructed to enter corresponding grooves or recesses 12 in the upper end 13 of the reamer or cutting-tool 3', the bore of the reamer or cutting-tool being bored to form a binding contact with the portion 8 of the arbor.

Having thus described the several parts of our invention, its operation is as follows: In order to attach the reamer or cutting-tool for operation, the sleeve 3 is threaded on the arbor 2 until the end of the sleeve abuts the shoulder 4, and the reamer 3' is passed over the portion 8 of the arbor, the grooves or recesses 12 in the top of the reamer registering with the lugs 11 on the end of the sleeve 3. When the device is rotated, the reamer or cutting-tool rotates with the arbor, and when it is desired to remove the reamer from the arbor a wrench is applied to the nut $3^2$ and the sleeve unthreaded, which forces the reamer or cutting-tool from the arbor, as shown in Fig. 3.

Having thus fully described our invention, we do not wish to be understood as limiting ourselves to the exact construction as herein set forth, as various slight changes may be made therein which would fall within the limit and scope of our invention, and we consider ourselves clearly entitled to all such changes and modifications.

What we claim as our invention, and desire to secure by Letters Patent of the United States, is—

1. An arbor having a shank and a shoulder, a threaded portion under said shoulder, a sleeve having a threaded portion for engagement with the threaded portion of the arbor and arranged to permit one end of the sleeve to abut against the shoulder, a cutting-tool arranged to be passed on the arbor, the said cutting-tool and the sleeve having interlocking engagement, whereby the cutting-tool may be rotated by the sleeve.

2. An arbor having a shank and a shoulder, a threaded portion below said shoulder, a sleeve having a threaded portion for engagement with the threaded portion of the arbor and arranged to permit one end of the sleeve to abut against the shoulder, a cutting-tool arranged to be passed on the arbor and abutting against the end of the sleeve, means for forming a positive engagement between the cutting-tool and the sleeve, whereby the said cutting-tool may be rotated by said sleeve and the tool forced from the arbor by rotating said sleeve on the arbor, substantially as described.

In testimony whereof we affix our signatures in presence of two witnesses.

ALBERT KOOTZ.
    CHARLES FREDERICK FISHER.

Witnesses:
 J. M. PORTER,
 D. W. DALEY.